United States Patent
Tortorella, Jr.

(10) Patent No.: US 12,378,035 B1
(45) Date of Patent: Aug. 5, 2025

(54) PALLET SYSTEM

(71) Applicant: Frank Joseph Tortorella, Jr., Park Ridge, IL (US)

(72) Inventor: Frank Joseph Tortorella, Jr., Park Ridge, IL (US)

(*) Notice: Subject to any disclaimer, the term of this patent is extended or adjusted under 35 U.S.C. 154(b) by 377 days.

(21) Appl. No.: 17/535,083

(22) Filed: Nov. 24, 2021

Related U.S. Application Data

(60) Provisional application No. 63/118,602, filed on Nov. 25, 2020.

(51) Int. Cl.
| | | |
|---|---|---|
| *B65D 21/02* | (2006.01) | |
| *B65D 19/00* | (2006.01) | |
| *B65G 1/16* | (2006.01) | |
| *B65G 57/00* | (2006.01) | |

(52) U.S. Cl.
CPC ..... *B65D 21/0224* (2013.01); *B65D 19/0028* (2013.01); *B65G 1/16* (2013.01); *B65G 57/005* (2013.01); *B65D 2519/00273* (2013.01); *B65D 2519/00288* (2013.01); *B65D 2519/00323* (2013.01); *B65D 2519/00338* (2013.01); *B65D 2519/0097* (2013.01); *B65G 2201/0267* (2013.01)

(58) Field of Classification Search
CPC .... B65G 57/005; B65G 1/16; B65D 19/0028; B65D 21/0224
USPC ............... 206/512, 586, 453, 599, 600, 511; 248/688, 345.02, 346.01, 345.1; 108/53.1, 55.3
See application file for complete search history.

(56) References Cited

U.S. PATENT DOCUMENTS

| | | | | |
|---|---|---|---|---|
| 4,799,620 A | * | 1/1989 | Vilella ................. | B65D 5/0065 206/509 |
| 4,801,018 A | * | 1/1989 | Wilde .................. | A47B 95/043 206/453 |
| 4,809,851 A | * | 3/1989 | Oestreich, Jr. ........... | B65D 7/32 220/4.31 |
| 4,988,083 A | * | 1/1991 | Bradley ................. | F16F 1/376 267/140 |
| 5,036,979 A | * | 8/1991 | Selz ....................... | B65D 19/20 206/386 |
| 5,154,297 A | * | 10/1992 | Farley ................ | B65D 71/0088 217/69 |
| 5,806,701 A | * | 9/1998 | Bae ....................... | B65D 88/121 206/509 |
| 6,811,125 B1 | * | 11/2004 | Koefelda .................. | G07F 9/10 248/677 |

(Continued)

FOREIGN PATENT DOCUMENTS

| | | | | |
|---|---|---|---|---|
| EP | 0270343 | A1 * | 8/1988 | |
| GB | 2126560 | A * | 3/1984 | ......... B65D 19/0028 |

(Continued)

*Primary Examiner* — Rafael A Ortiz
(74) *Attorney, Agent, or Firm* — MARSHALL, GERSTEIN & BORUN LLP

(57) ABSTRACT

In some examples, a pallet connector includes a body defining a first connector on a first side of the body and one or more lateral structures extending from a second side of the body, wherein the one or more lateral structures are to prevent movement of the body relative to a structure on which the body is disposed, and wherein the first connector comprises a male connector, a female connector, or both a male connector and a female connector.

10 Claims, 20 Drawing Sheets

(56) References Cited

U.S. PATENT DOCUMENTS

| | | | | |
|---|---|---|---|---|
| 7,997,213 B1 * | 8/2011 | Gauthier | ............... | B65D 88/022 294/67.1 |
| 8,297,004 B2 * | 10/2012 | Knight, III | ........... | B23Q 1/0054 248/188.4 |
| 8,690,471 B2 * | 4/2014 | Wians | .................... | A47B 47/00 211/183 |
| 2009/0266739 A1 * | 10/2009 | Kindig | .................. | B65D 85/30 206/521 |
| 2011/0108549 A1 * | 5/2011 | Mitchell | ................ | B65D 19/06 206/599 |
| 2015/0266616 A1 * | 9/2015 | Barrable | ............ | B65D 90/0006 403/267 |

FOREIGN PATENT DOCUMENTS

| | | | | |
|---|---|---|---|---|
| GB | 2477328 A * | 8/2011 | ......... | B29C 45/2628 |
| WO | WO-2005030593 A1 * | 4/2005 | ........ | B65D 21/0224 |
| WO | WO-2021224781 A1 * | 11/2021 | ........ | B65D 21/0224 |

\* cited by examiner

PALLET SYSTEM

RELATED APPLICATIONS

This application claims priority to U.S. Provisional Patent Application Ser. No. 63/118,602, file on Nov. 25, 2020, the contents of which are incorporated herein by reference in their entirety.

BACKGROUND

A pallet is a flat transport structure, which supports goods in a stable fashion while being lifted by a forklift, a pallet jack, a front loader or a jacking device. A pallet is the structural foundation of a unit load which allows handling and storage efficiencies.

Figure 1:
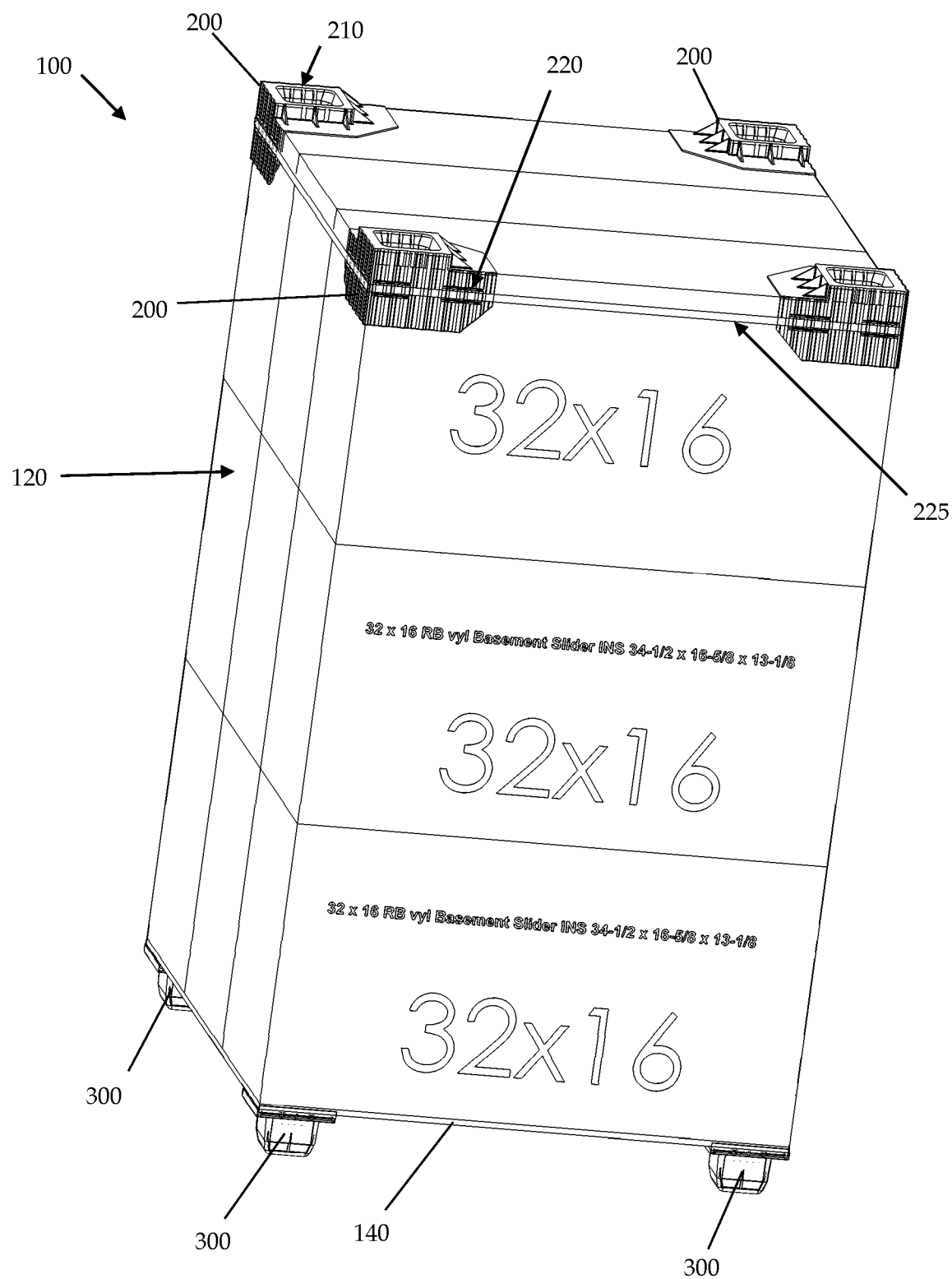
FIG. 1 is an example first front perspective view of an example pallet system in accord with at least some of the present concepts.

The figures are not necessarily to scale. Wherever possible, the same reference numbers, or similar reference numbers, are used throughout the drawing(s) and accompanying written description to refer to the same or like parts. As used herein, stating that any part is in any way positioned on (e.g., positioned on, located on, disposed on, etc.) another part, indicates that the referenced part is either in contact with the other part, or that the referenced part is above the other part with one or more intermediate part(s) located therebetween. Stating that any part is in contact with another part means that there is no intermediate part between the two parts.

BRIEF DESCRIPTION

In some examples, the present concepts include a pallet connector, including a body defining a first connector on a first side of the body and one or more lateral structures extending from a second side of the body, wherein the one or more lateral structures are to prevent movement of the body relative to a structure on which the body is disposed, and wherein the first connector comprises a male connector, a female connector, or both a male connector and a female connector.

In some examples, the present concepts include a pallet connector system including a plurality of pallet connectors each pallet connector of the plurality of pallet connectors comprising a body defining a first connector comprising a male connector, a female connector, or both a male connector and a female connector on a first side of the body and further comprising one or more lateral structures extending from a second side of the body, the one or more lateral structures to prevent movement of the body relative to a structure on which the body is disposed, and a plurality of pallet feet, each pallet foot of the plurality of pallet feet comprising a body defining a shape dimensioned for engagement with the first connector.

In some examples, the present concepts include a method for organizing product containers on a pallet, the method comprising disposing a first array of product containers on a pallet comprising a plurality of first pallet feet, the pallet being dimensioned at least substantially similarly to that of a first footprint of the first array of product containers; and disposing a plurality of first pallet connectors on an upper surface of the first array of product containers, each pallet connector of the plurality of first pallet connectors comprising a body defining a first connector comprising a male connector, a female connector, or both a male connector and a female connector on a first side of the body and further comprising one or more lateral structures extending from a second side of the body, the one or more lateral structures to prevent movement of the body relative to a structure on which the body is disposed, wherein the first array of product containers may include an n×n array, an n×m array, or a combination of one or more n×n arrays and one or more n×m arrays, wherein n and m may be any integer.

DETAILED DESCRIPTION

In some aspects, this disclosure relates to improvements in pallet systems. Conventional pallet systems generally comport with one or more predefined sizes sanctioned by one or more national or international standard-setting organizations which establish and promulgate standards for pallets concerning universal standards for pallet dimensions, types of material used in construction, performance standards, and testing procedures. For instance, the International Organization for Standardization (ISO) sanctions six pallet dimensions, detailed in ISO Standard 6780:2003. As another example, the Grocery Manufacturers Association (GMA) has suggested a variety of standard pallet dimensions, the most common of which is 48"×40", and constructions. Pallet designs may include, by way of example, stringer pallets built with wood, plastic or metal stringers/slats/boards that run between the top and bottom deck boards to add increased load support. These pallets can come in either a "two-way" design to allow forklifts to enter from two sides, or a "four-way" design to design allow forklifts to enter from all four sides. Pallet designs may also include block pallets, which utilize structural members to stabilize the top deck, and solid deck pallets, which have a single solid sheet of wood with no spaces on its top surface, instead of a series of stringers, slats or boards. Pallet designs may further include reversible and non-reversible double face pallets, which have decks on both the top and bottom of the pallet, of which the reversible double face pallet has identical top and bottom deck boards and can hold a load on either side (i.e., it doesn't matter which side is facing the load).

However, the standard pallet systems are not necessarily conducive to specific products or needs of specific manufacturers.

In accord with aspects of the present concepts, pallets may be specifically dimensioned to arrangements of an array of product containers (e.g., an n×n array, an n×m array, a combination of one or more n×n arrays and one or more n×m arrays, or a combination of three or more different arrays, wherein n and m may be any integer) for one or more of a manufacturer's specific packaged products (e.g., one product, two products, three products, etc.), which at least substantially matches a footprint of the pallet to a footprint of the desired array of product containers, thus eliminating or substantially reducing pallet area extending beyond that which is required to support the array of product containers. In a warehouse, large numbers of pallets sized to correspond to, or sized to at least substantially correspond to, the footprint of the product(s) borne thereon can then be disposed close together in a close-packed arrangement to maximize the amount of product stored within a given area in the warehouse by minimizing wasted space that would ordinarily exist between pallets and/or by minimizing wasted space that would ordinarily exist on the pallets by product(s) or product arrays inaptly sized to the conventional pallet configurations. The present concepts also enable arrangements of different configurations of pallets for different arrangements of products such that the plurality of different pallets (e.g., two different rectangular pallets, a square pallet and a rectangular pallet, two square pallets of different sizes, etc.) can be arranged in a tiling or tessellation pattern to, again, maximize an amount of product capable of being stored within a predetermined space of a warehouse, shipping container, or transport (e.g., ship, truck, plane, etc.).

In some examples, the pallets are made from wood, plastic, polymer, composite materials, metal and/or combinations of one or more thereof.

In some examples, the pallets comprise a substantially planar support surface, comprising one or more materials (e.g., wood, plastic(s), polymer(s), etc.) and/or one or more parts, selected and arranged to, or cut to, or formed to, approximate a footprint of a predetermined array of product container(s) (e.g., an array of boxes containing windows, etc.). In some examples, the substantially planar support surface comprises a ⅜" board (or a thicker board, if needed, based on a weight of the array of product containers) cut to or otherwise adapted to the size of a footprint of the one or more containers in contact with the substantially planar support surface.

Figure 2:
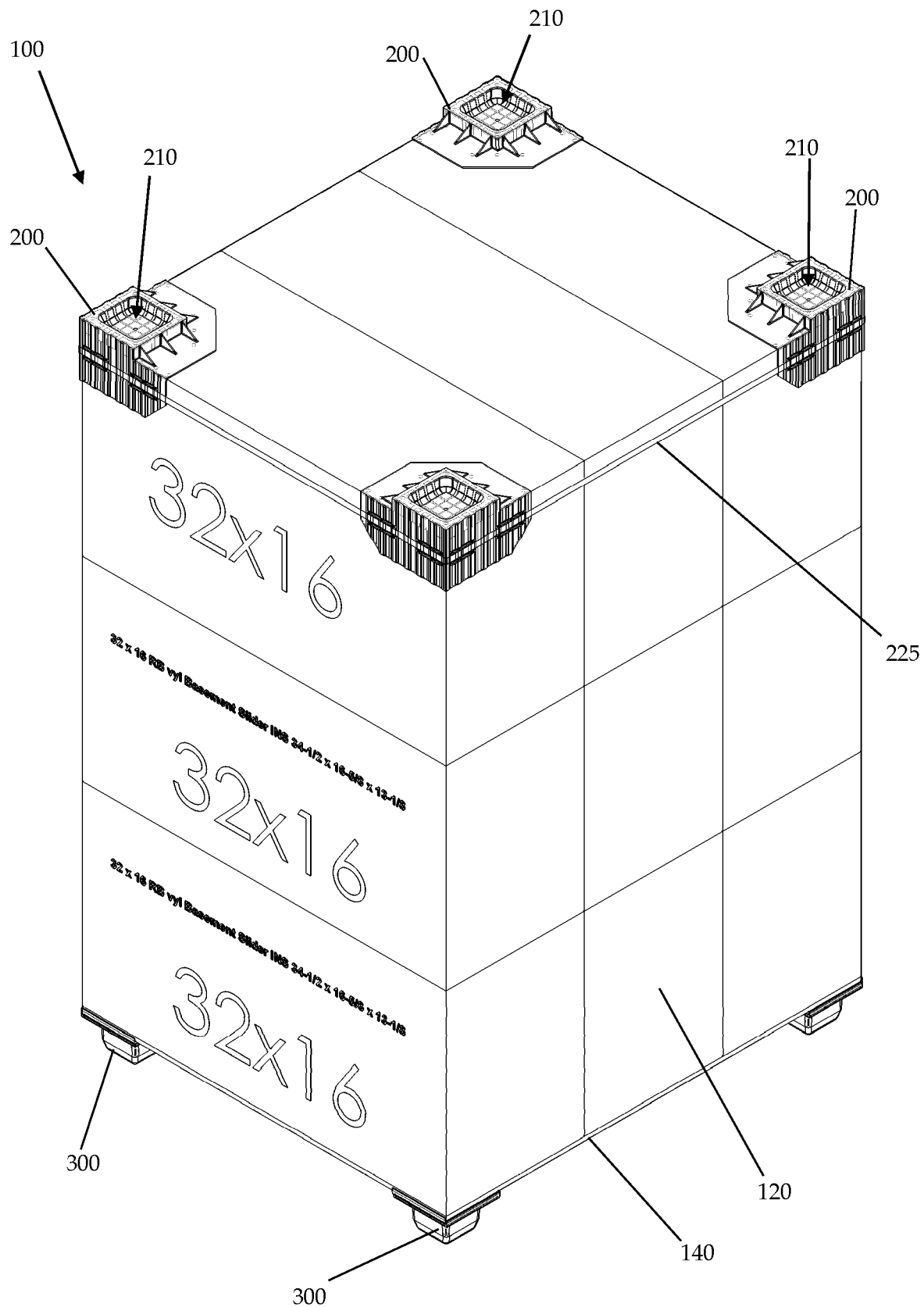
FIG. 2 is an example second front perspective view of the example pallet system in accord with at least some of the present concepts.
Figure 3:
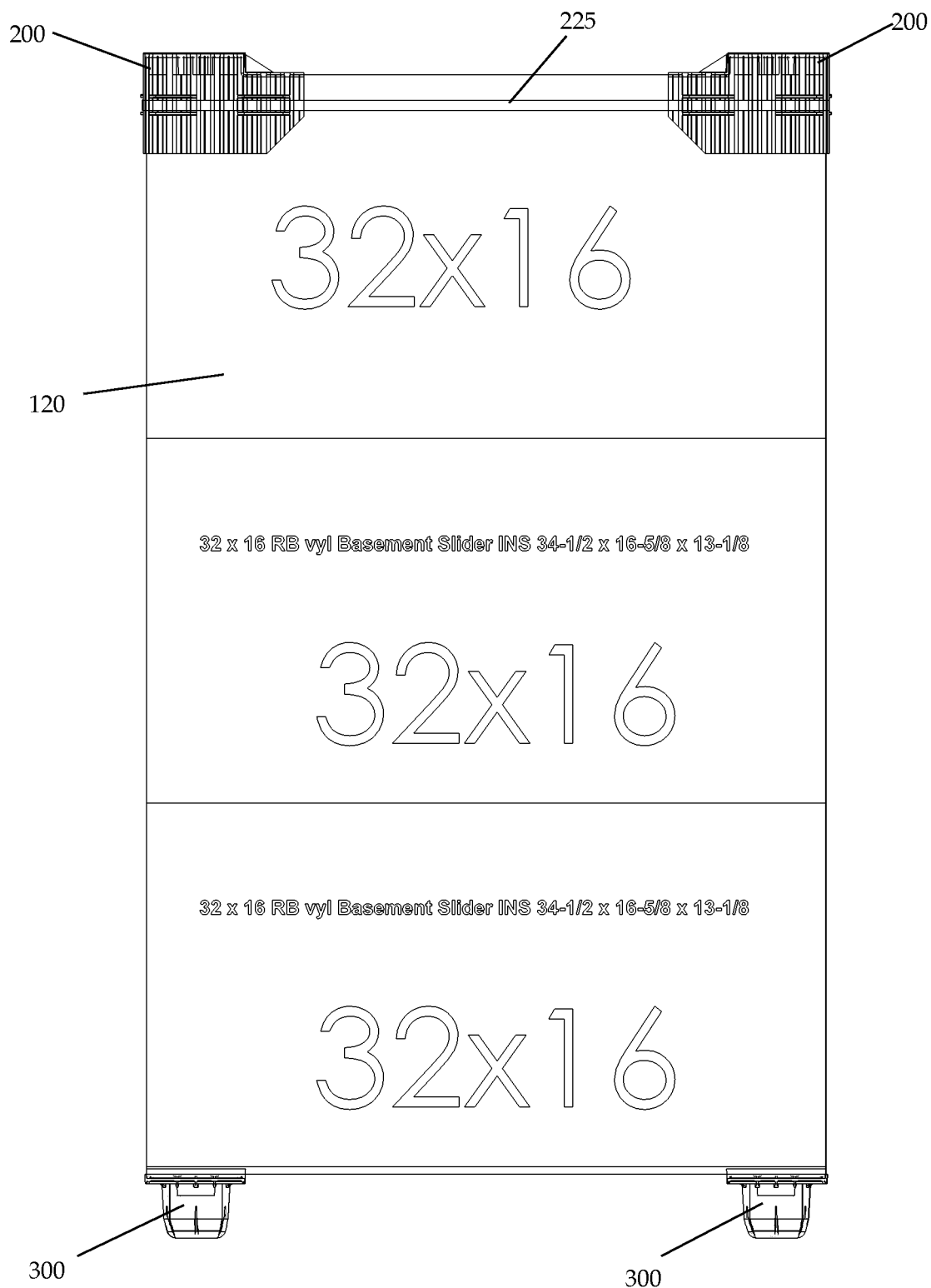
FIG. 3 is an example first side view of the example pallet system in accord with at least some of the present concepts.
Figure 4:
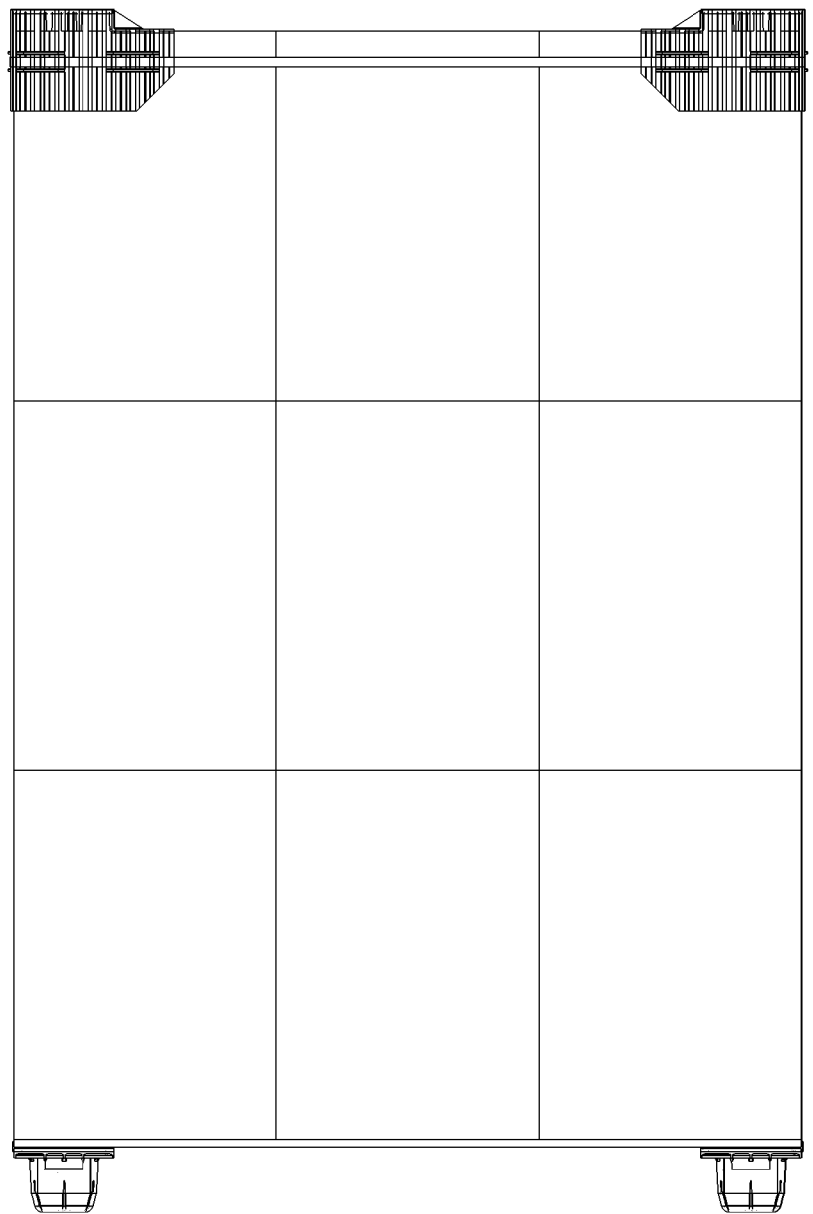
FIG. 4 is an example second side view of the example pallet system in accord with at least some of the present concepts.

FIGS. 1-2 are example perspective views of an example pallet system 100 in accord with at least some of the present concepts and FIGS. 3-4 are example side views of the example pallet system 100 of FIGS. 1-2.

Figure 7:
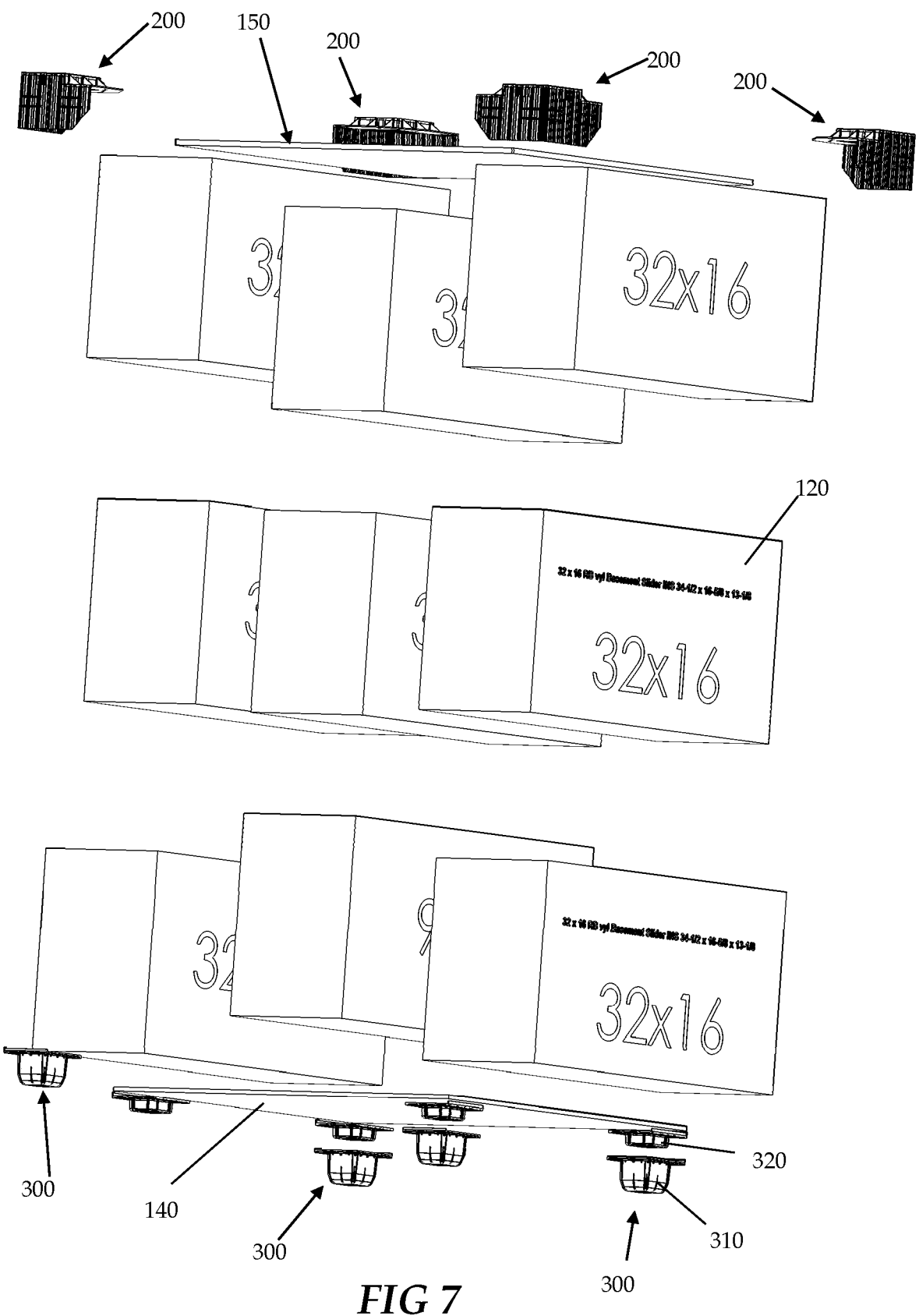
FIG. 7 is an example exploded front perspective view of the example pallet system in accord with at least some of the present concepts.
Figure 8:
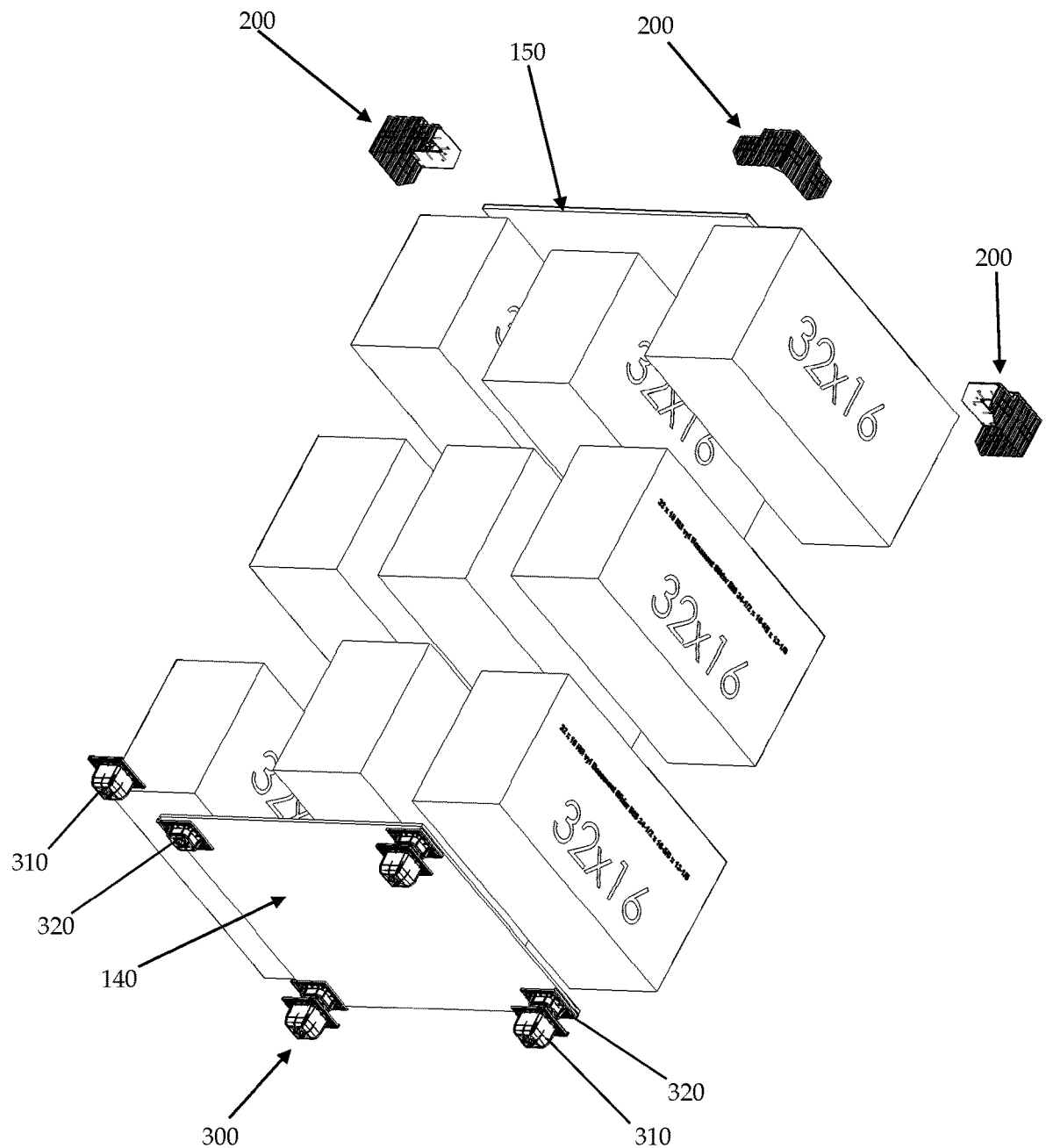
FIG. 8 is an example exploded bottom perspective view of the example pallet system in accord with at least some of the present concepts.
Figure 9:
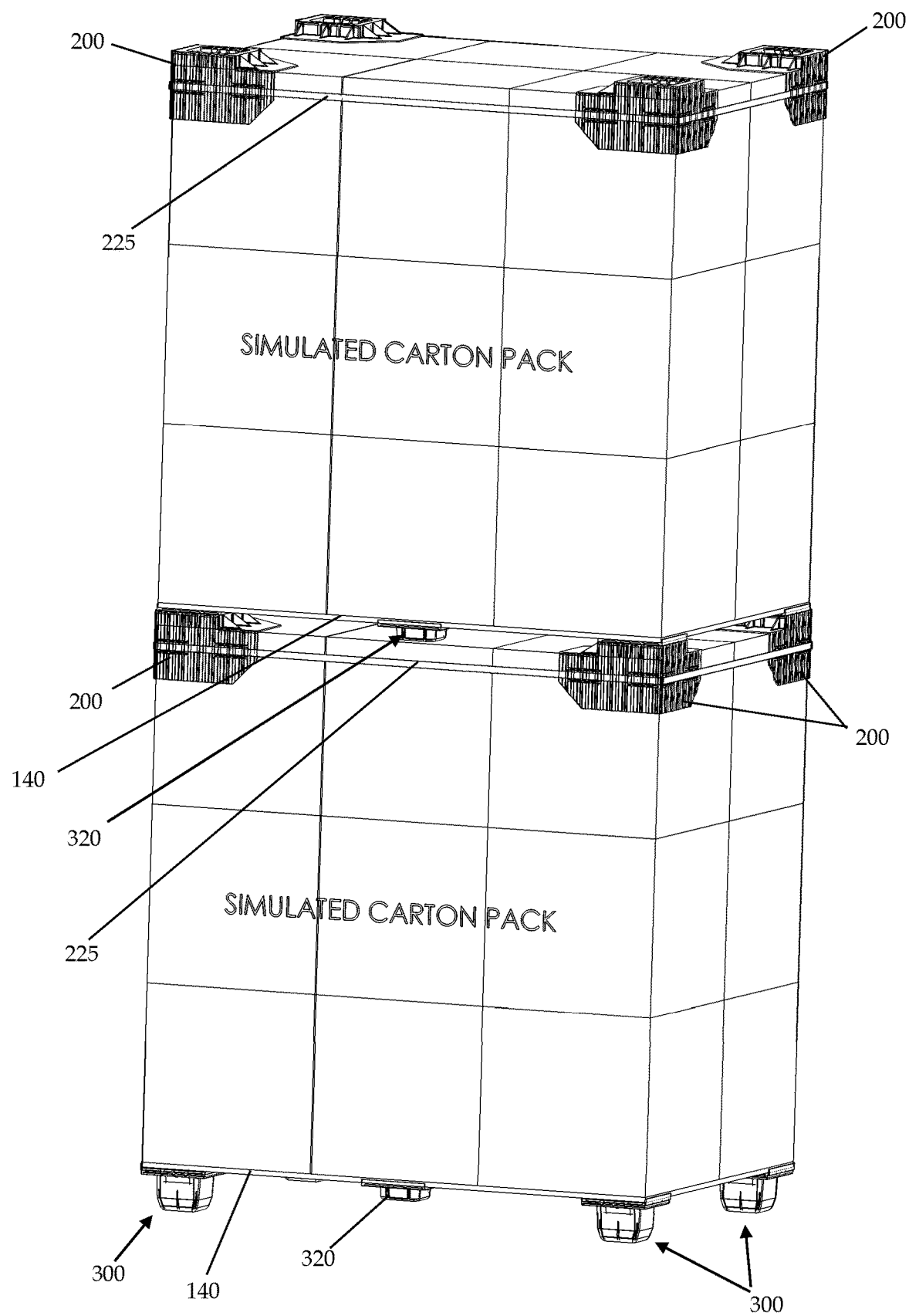
FIG. 9 is an example first front perspective view of an example second implementation of the example pallet system in accord with at least some of the present concepts.
Figure 10:
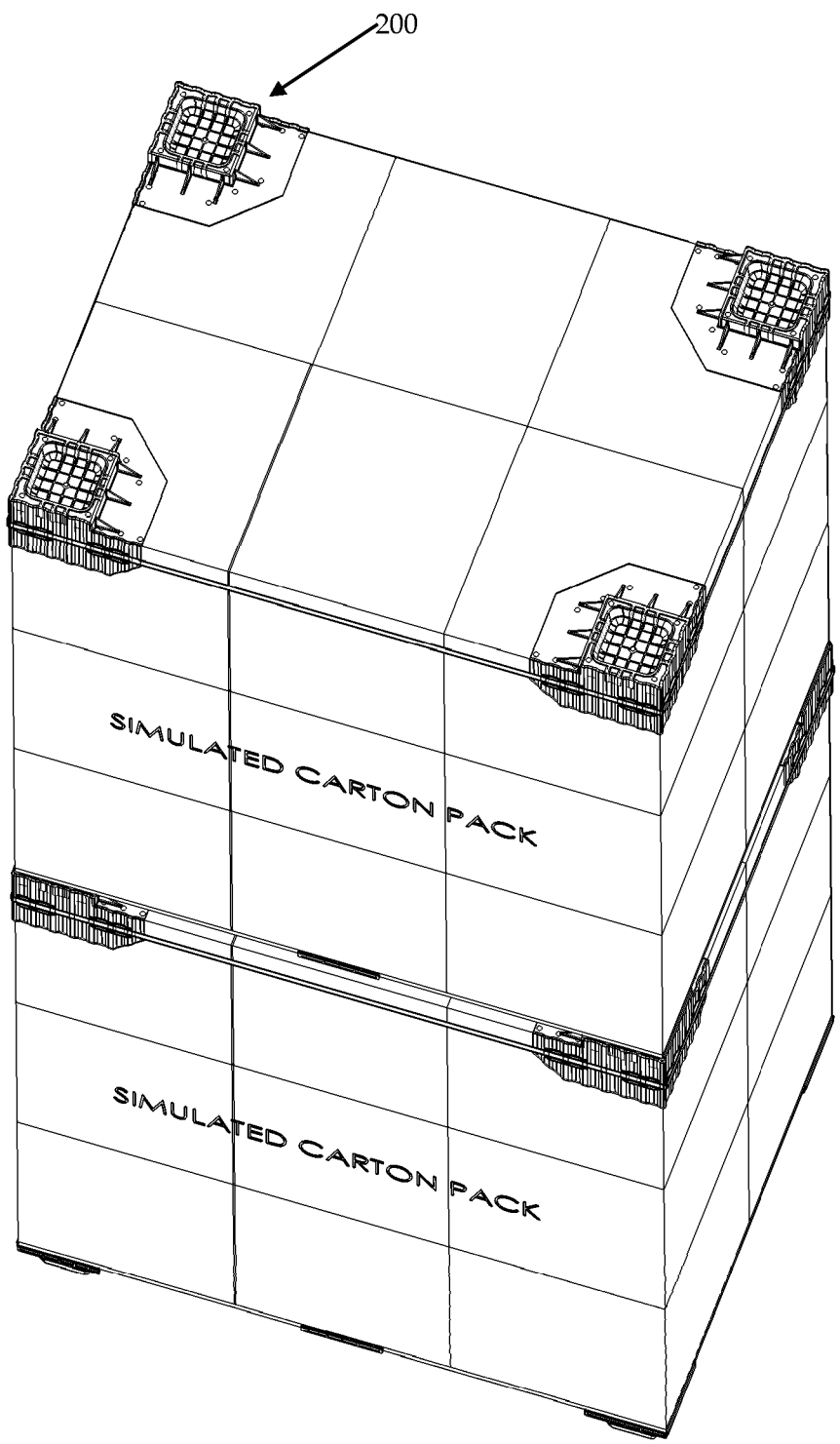
FIG. 10 is an example second perspective view of the example second implementation of the example pallet system in accord with at least some of the present concepts.
Figure 11:
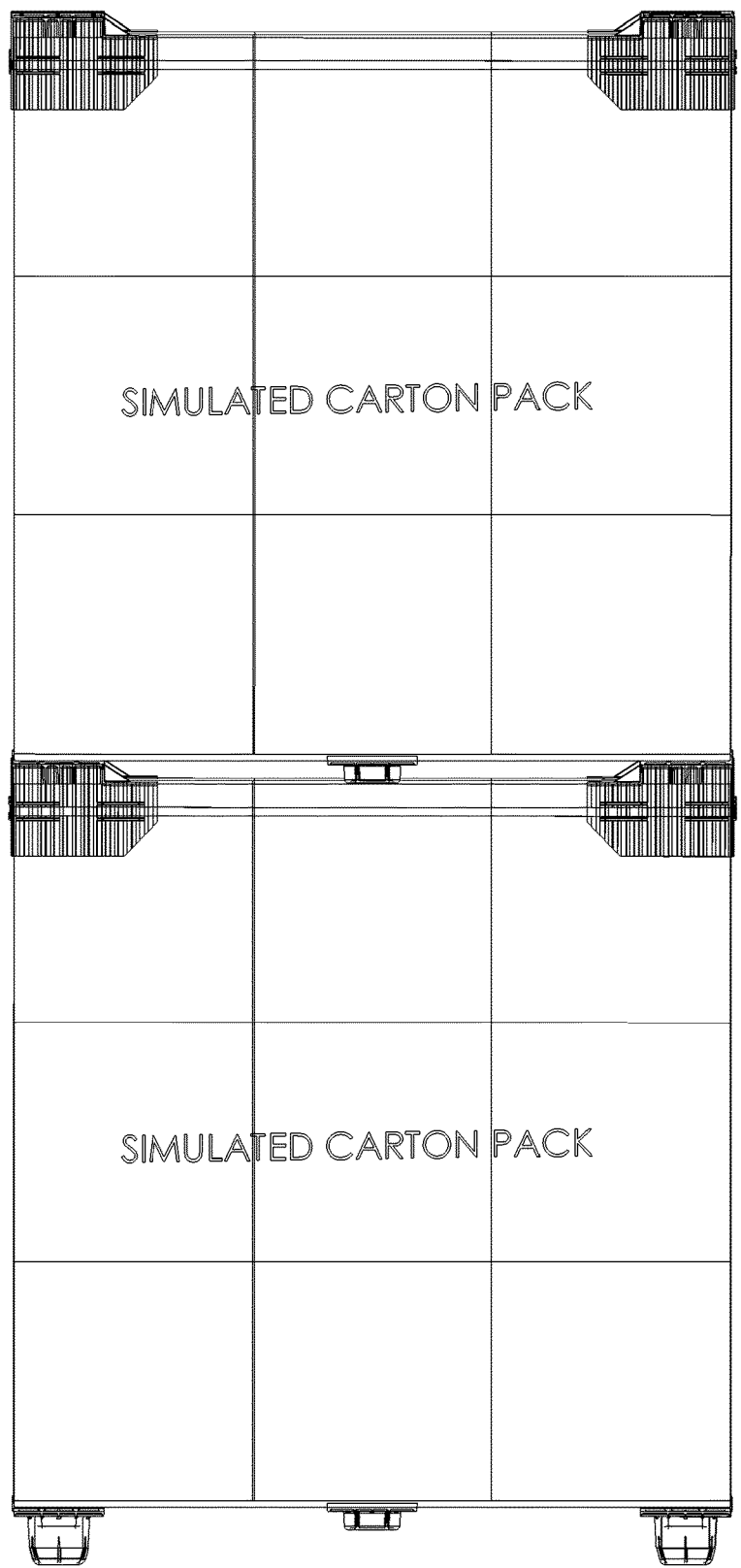
FIG. 11 is an example first side view of the example second implementation of the example pallet system in accord with at least some of the present concepts.
Figure 12:
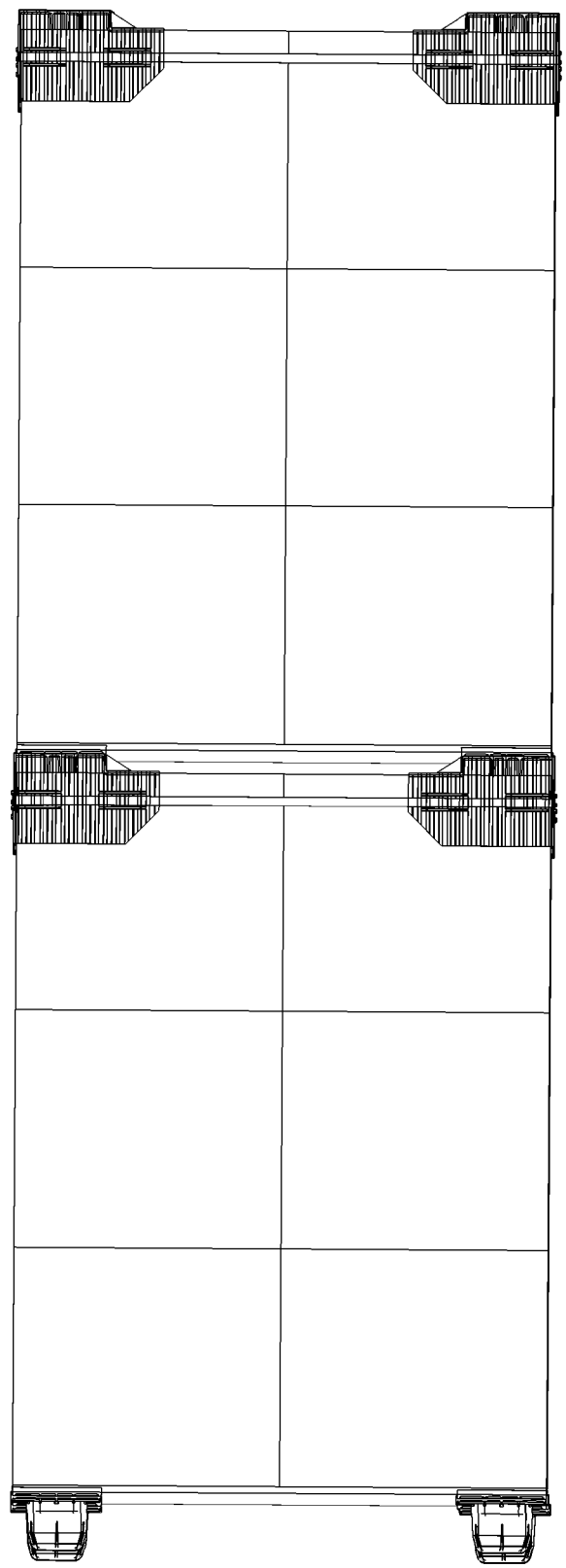
FIG. 12 is an example second side view of the example second implementation of the example pallet system in accord with at least some of the present concepts.
Figure 13:
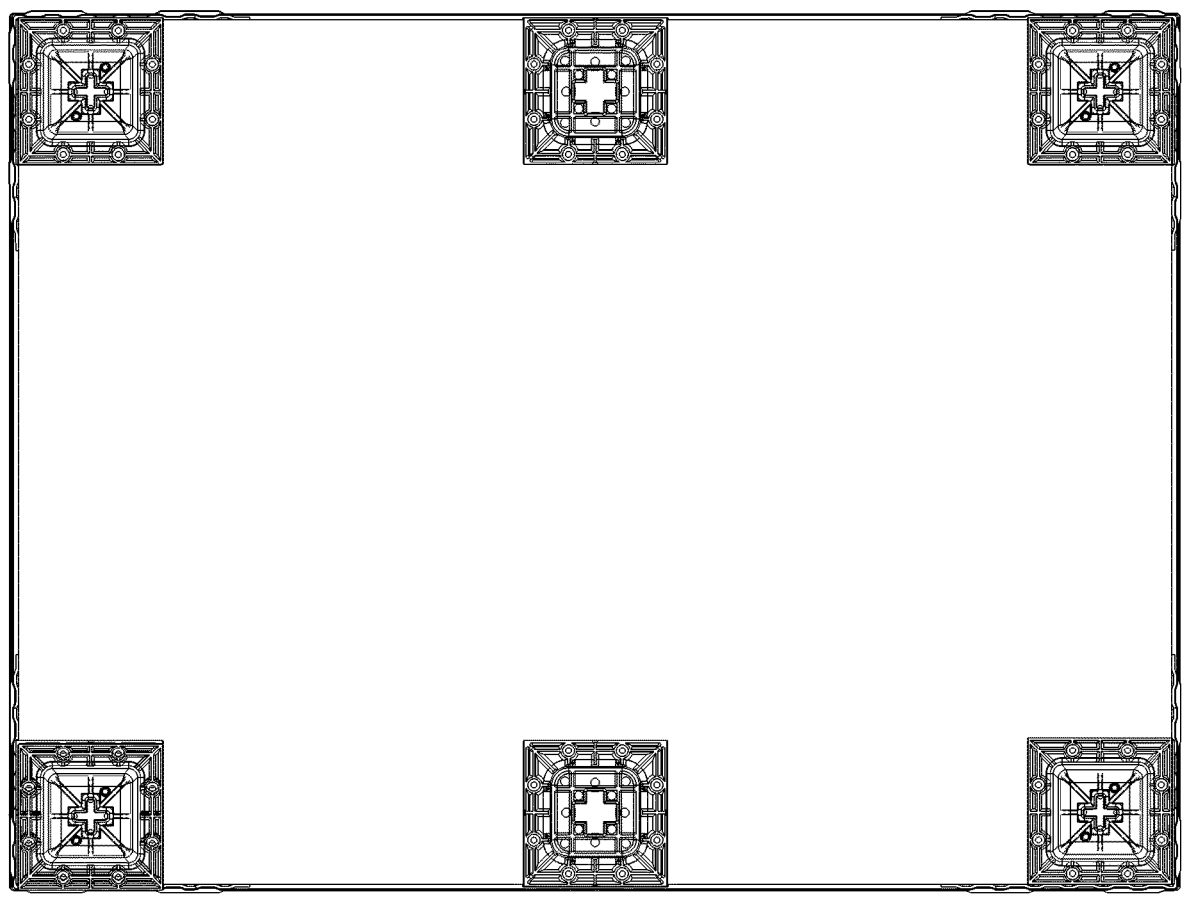
FIG. 13 is an example bottom view of the example second implementation of the example pallet system in accord with at least some of the present concepts.
Figure 14:
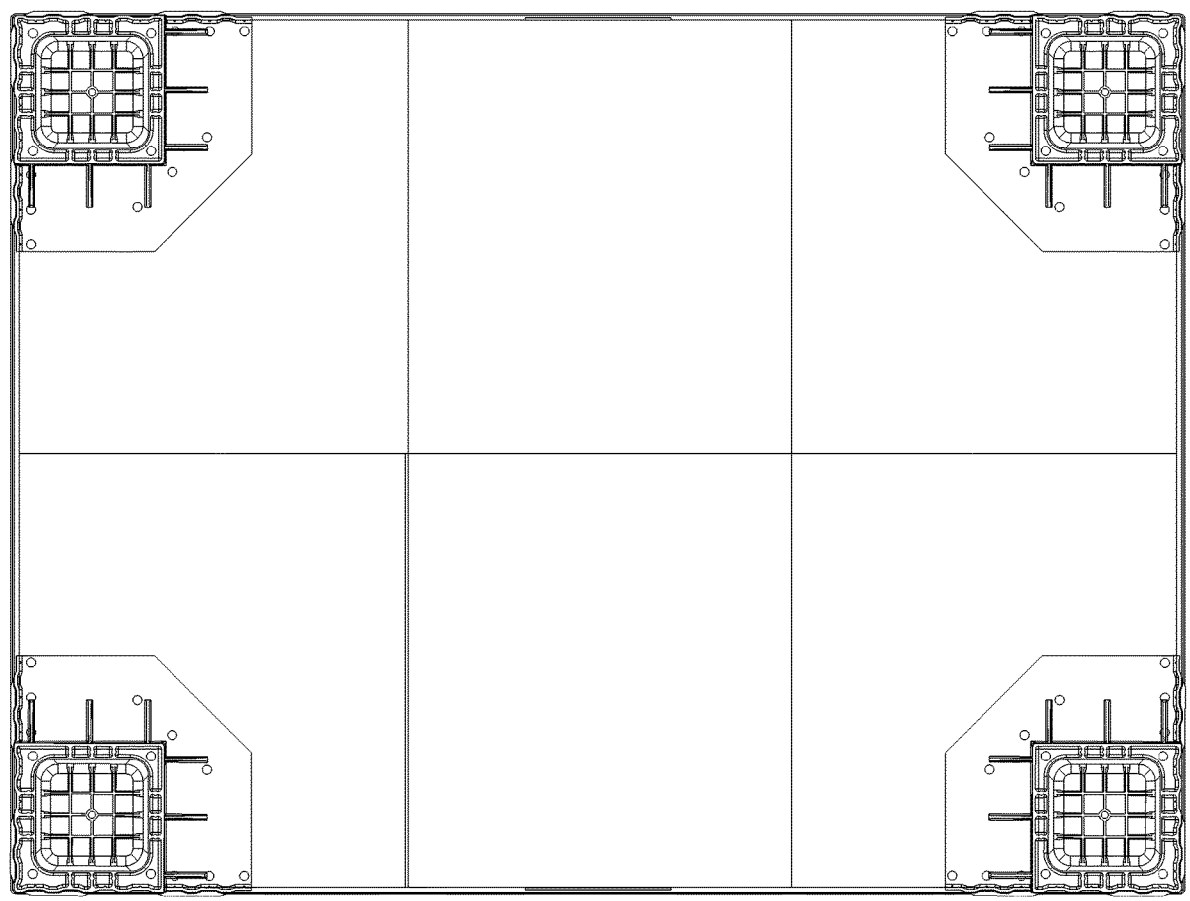
FIG. 14 is an example top view of the example second implementation of the example pallet system in accord with at least some of the present concepts.
Figure 15:
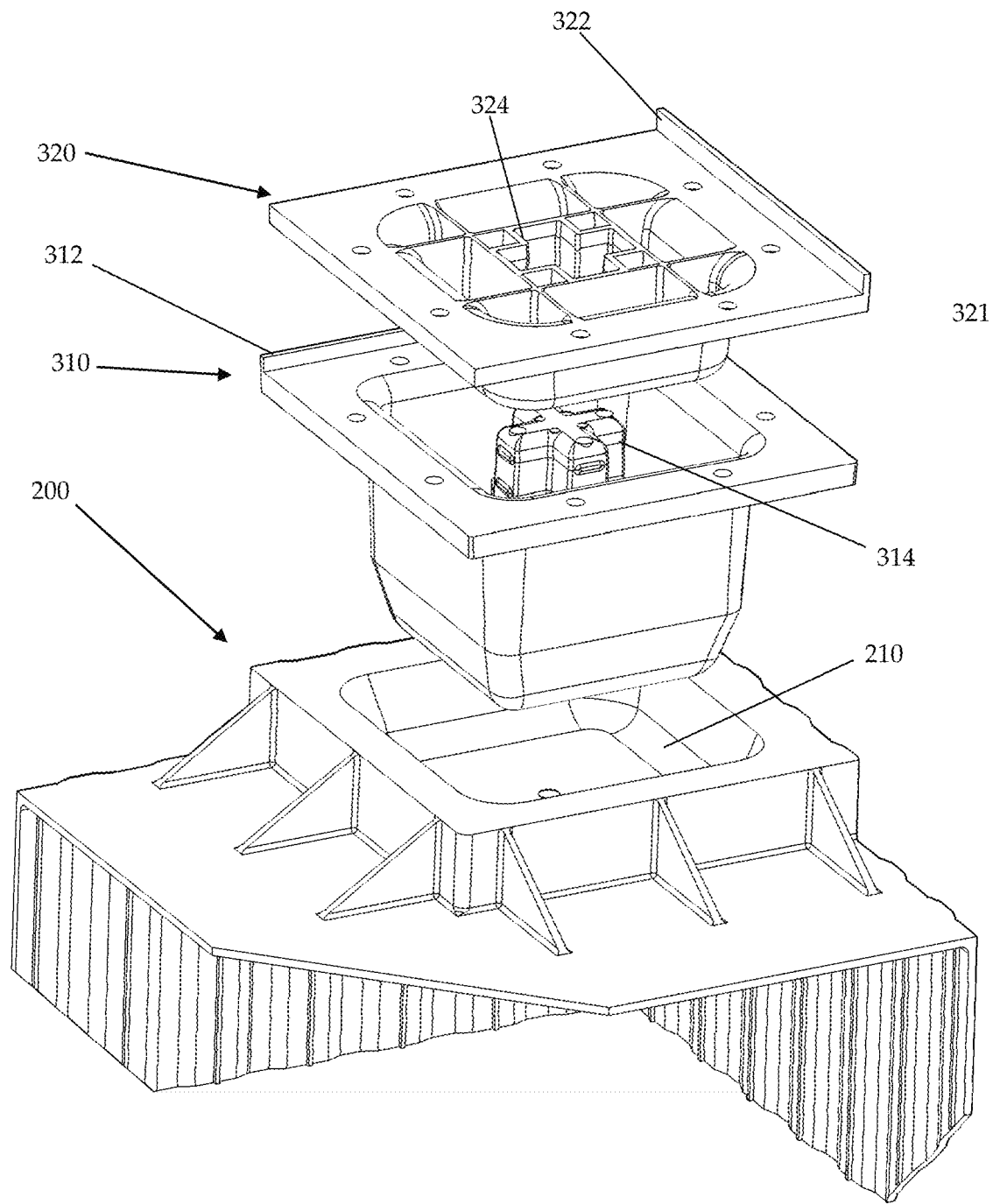
FIG. 15 is an example first perspective exploded view of an example pallet connector for an example pallet system in proximity to an example pallet foot and an optional example pallet foot extender for the example pallet system in accord with at least some of the present concepts.

FIGS. 1-4 show an example array 120 of example product containers arranged in a 3×3 array disposed on an example substantially planar support surface 140. As noted above, the example array 120 of example product containers could comprise, for instance, an n×n array, an n×m array, or a combination of one or more n×n arrays and one or more n×m arrays, wherein n and m may be any integer. The example substantially planar support surface 140 includes, in a vicinity of each corner, a downwardly depending or outwardly extending example pallet foot 300. In some examples, the example pallet feet 300 may be optionally omitted in favor of another support structure, such as but not limited to wood blocks or conventional unitary plastic or metal pallet feet. In some examples, the example pallet feet 300 are about 1.25" in height to accommodate insertion of forks from conventional lift trucks. In some examples, each example pallet foot 300 is less than, or greater than, 1.25", being sized to accommodate the fork of the equipment (e.g., pallet jack truck, manual hydraulic forklift, forklift, etc.) to be used to move the example pallet. As shown in other figures herein, such as FIGS. 7-8 and 15-20, the present concepts optionally include a pallet foot 300 that is configurable to modify one or more characteristics of (e.g., a height of) the pallet foot 300 and includes an assemblage of a plurality of separate parts. For instance, as shown in FIG. 7, an example pallet foot 300 comprises an example first pallet foot 320 onto which an example first pallet foot extender 310 is disposed or attached. In some examples, the example first pallet foot 320 is about 1.25" in height, but it is desired to provide a greater clearance between pallets (e.g., to accept forks of a pallet truck, etc.), so an example first pallet foot extender 310 is disposed on the example first pallet foot 320 to extend the pallet foot 300 to about 3". While this example cites an example pallet foot 300 of about 1.25" in height and an example first pallet foot extender 310 of about 1.75" to produce a combined 3", the present concepts include variations of example pallet foot 300 and first pallet foot extender 310 combinations. For instance, the present concepts include a plurality of selectable first pallet foot extenders 310 having a plurality of different heights (e.g., a 0.125" extender, a 0.25" extender, a 0.50" extender, a 0.75" extender, a 1.00" extender, a 1.50" extender, a 1.75" extender, a 2.00"

extender, a 1.0 cm extender, a 1.5 cm extender, a 2.0 cm extender, a 2.5 cm extender, a 3.0 cm extender, a 3.5 cm extender, a 4.0 cm extender, a 4.5 cm extender, a 5.0 cm extender, etc., as well as any intermediary sizes therebetween). In some examples, a plurality of selectable first pallet foot extenders 310 of the same size, or of one or more different sizes, may themselves be combined, such as two 0.25" extenders being combined to produce a 0.50" extender.

In some examples, such as shown by way of example in FIGS. 15-20, the example first pallet foot 320 comprises a first male connector 321 with an optional example first female connector 324 formed within a portion of the first male connector 321 (e.g., a central portion (as shown), a peripheral portion, etc.), with the example pallet foot extender 310 comprising a second male connector 311, with an optional second female connector 313 having an optional example third male connector 314 formed within a central portion of the first female connector 313. In the example of FIGS. 15-20, the example form of the example first female connector 324 and the example third male connector 314 are generally cruciform in shape. In other examples, the example first female connector 324 and the example third male connector 314 may include any mating male and female geometry (e.g., mating cylindrical shapes, mating rectangular shapes, etc.) wherein the first male connector 321 of the pallet foot 300 is cooperatively received within the second female connector 313 of the pallet foot extender 310 and the second male connector 311 of the pallet foot extender 310 is cooperatively received within the first female connector (e.g., 210) of the pallet foot 300. In some examples, the example first female connector 324 and the example third male connector 314 may interlock such that removal would require manipulation of a locking element to separate the example first female connector 324 and the example third male connector 314. In some examples, the example first female connector 324 and the example third male connector 314 engage one another but do not lock, yet still entirely or substantially restrain lateral relative motion as between the example first female connector 324 and the example third male connector 314.

In other examples, the example first pallet foot 320 and the example pallet foot extender 310 omit a male or female connector. In some examples, the example first pallet foot 320 and the example pallet foot extender 310 are optionally connected via one or more mechanical fasteners (e.g., screw, bolt, latch, etc.) and/or or adhesive.

FIGS. 1-4 show, on an upper portion of the example array 120 of example product containers, a plurality of pallet connectors 200, each of the plurality of pallet connectors 200 comprising a body defining an example first connector 210 on a first side of the body and one or more lateral structures extending from a second side of the body, wherein the one or more lateral structures are to prevent movement of the body relative to a structure on which the body is disposed in a direction perpendicular to the one or more lateral structures, and wherein the first connector comprises a male connector, a female connector, or both a male connector and a female connector.

In some examples, the one or more lateral structures comprise one or more walls.

In some examples, the one or more lateral structures comprise a first lateral wall and a second lateral wall and, optionally, a top wall. In some examples, an underside of one or more of the lateral structures (e.g., example first lateral wall 204 of FIG. 16, example second lateral wall 206 of FIG. 16, etc.) and/or an underside of a top wall (e.g., example top wall 202 of FIG. 16) comprise a surface feature to engage a surface of a product container or surface on which the pallet connector 200 is disposed. In some examples, the surface feature may comprise one or more small projections or spikes. For instance, in some examples, the example first lateral wall 204 and/or the example second lateral wall 206 (see FIG. 16) comprise a plurality of small ribs (e.g., 0.050"×0.050" ribs) that are biased into the sides of the product container when the example strap 225 is tightened to impart a hoop stress across the example connected pallet connectors 200. In some examples, the example underside of a top wall (e.g., example top wall 202 of FIG. 16) comprises a plurality of small ribs (e.g., 0.050"× 0.050" ribs) that are biased into the upper surfaces of the product container(s) when a weight (e.g., another pallet) is disposed thereupon.

In some examples, the surface feature may comprise a high friction surface. In some examples, the surface feature may comprise an applique having a high friction surface and/or small projections or spikes.

Figure 16:
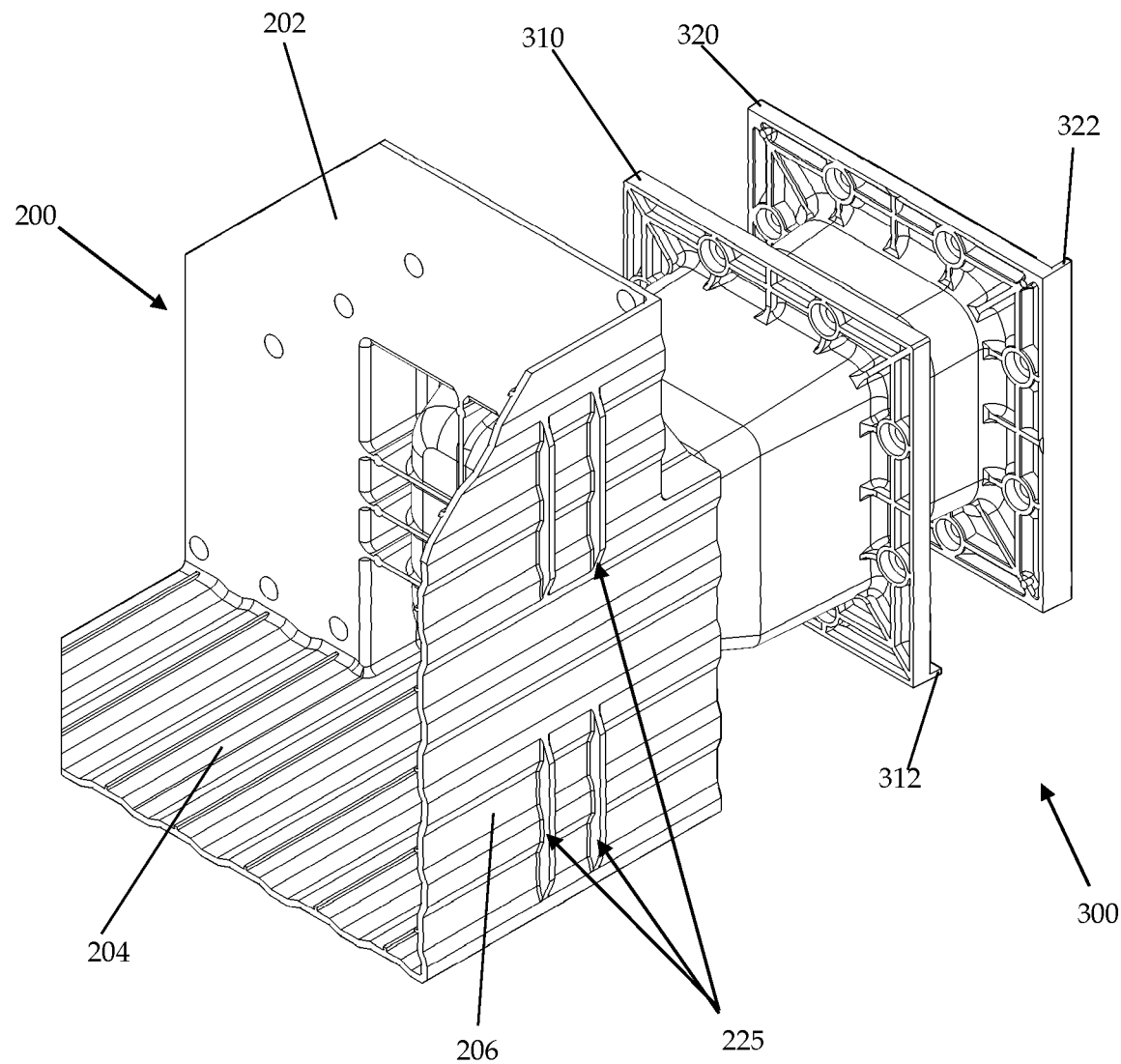
FIG. 16 is an example second perspective exploded view of an example pallet connector for an example pallet system in proximity to an example pallet foot and an optional example pallet foot extender for the example pallet system in accord with at least some of the present concepts.
Figure 17:
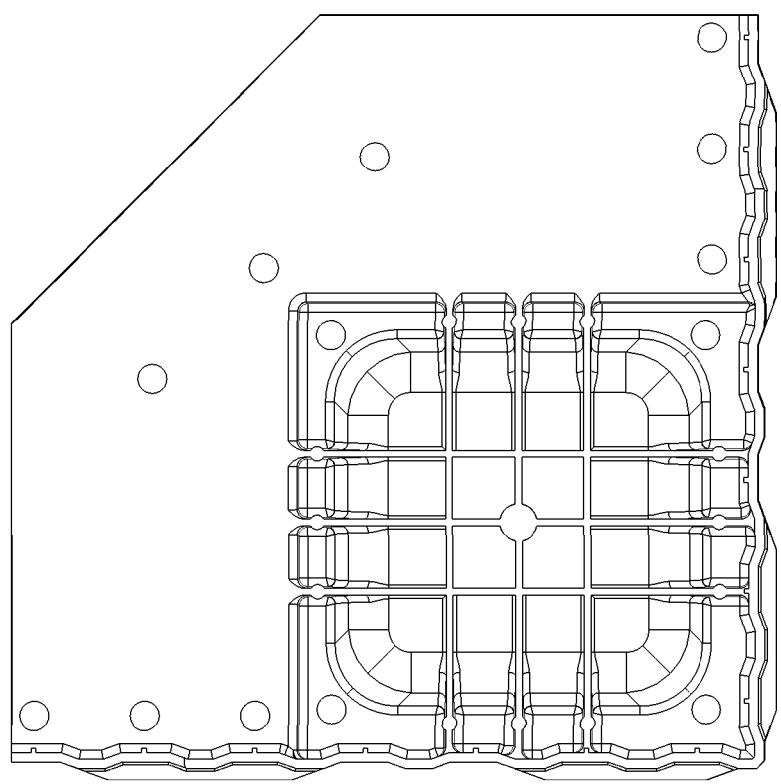
FIG. 17 is an example bottom view of the example pallet connector, the example pallet foot, and the example pallet foot extender of FIGS. 15-16 in accord with at least some of the present concepts.
Figure 18:
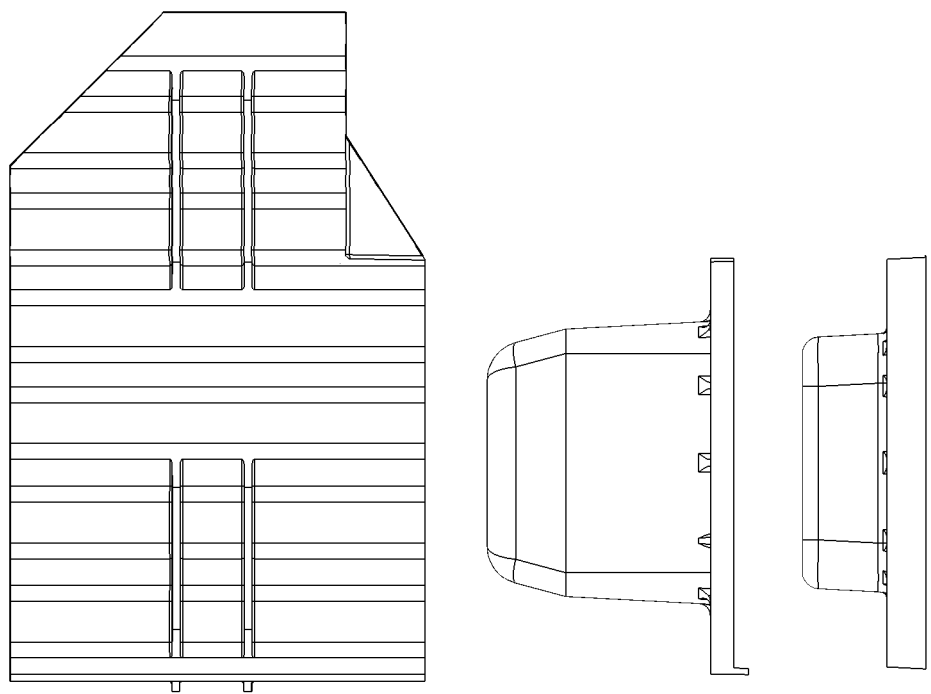
FIG. 18 is an example first side view of the example pallet connector, the example pallet foot, and the example pallet foot extender of FIGS. 15-17 in accord with at least some of the present concepts.
Figure 19:
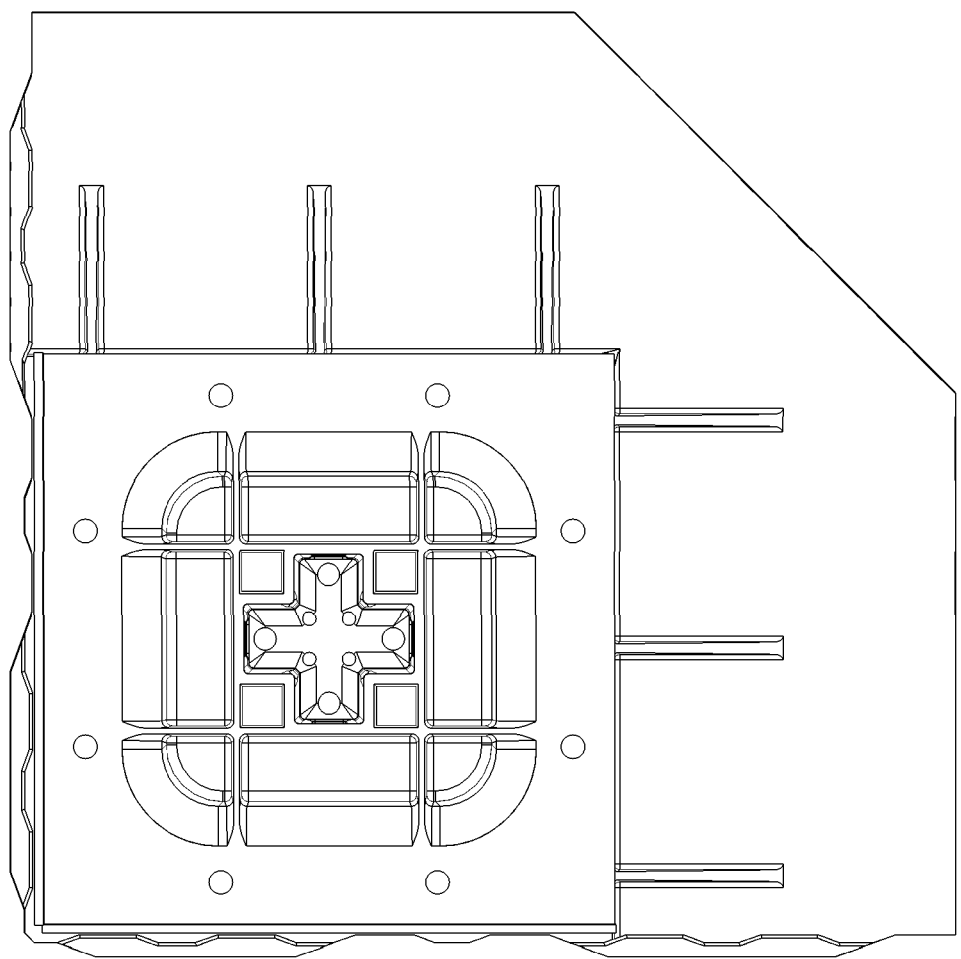
FIG. 19 is an example top view of the example pallet connector, the example pallet foot, and the example pallet foot extender of FIGS. 15-19 in accord with at least some of the present concepts.
Figure 20:
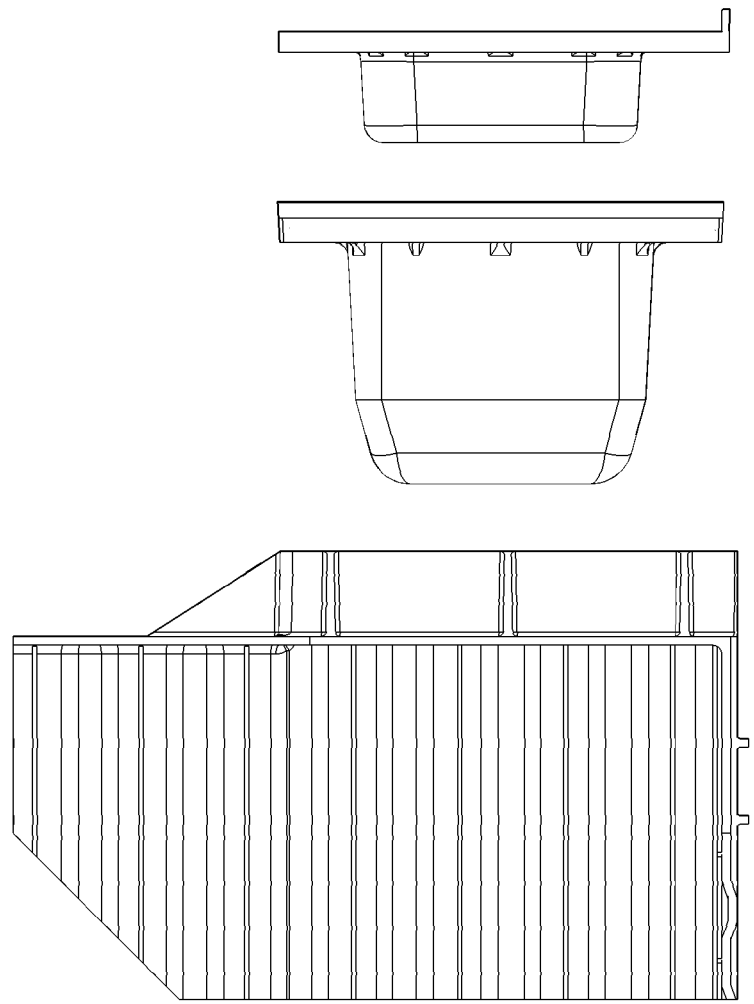
FIG. 20 is an example second side view of the example pallet connector, the example pallet foot, and the example pallet foot extender of FIGS. 15-17 in accord with at least some of the present concepts.

As shown in FIGS. 1-2, the example pallet connectors 200 include example optional strap retention features 220 to retain an example strap 225. In some examples, such as is best shown in FIG. 16 and FIG. 18, the example strap retention feature comprises one or more upper protrusions and one or more lower protrusions spaced apart from the one or more upper protrusions by a predetermined distance generally dimensioned to accept and retain a pallet connector strap by limiting upward or downward movement of the strap. The lower protrusions and/or upper protrusions may be continuous or discontinuous. In other examples, the example strap retention comprises one or more tie downs, latches or loops. In some examples, the one or more upper protrusions and the one or more lower protrusions comprise spaced apart continuous protrusions, in one or more sections on or more of the lateral structures or lateral walls, defining a channel to accept and retain the pallet connector strap.

In the example shown in FIGS. 1-2, the example first connector 210 of the example pallet connectors 200 comprises a female connector (e.g., a recession) dimensioned to receive the example pallet foot 300. In some examples, a depth of the first connector is less than or equal to about 1.25". In some examples, a depth of the first connector is less than or equal to about 3".

In some examples, the pallet connector is formed from a polymer, polyethylene terephthalate (e.g., recycled plastic bottles, etc.), polycarbonate, high-density polyethylene, polyvinyl chloride, or an acrylonitrile butadiene styrene.

In some examples, the lateral sides of the first connectors (e.g., 210) and the lateral sides of the pallet feet (e.g., 300) are matingly angled or chamfered to cooperatively facilitate alignment and connection of an upper pallet 100 to a lower pallet 100'. In some examples, the example pallet feet 300 (e.g., the first pallet foot 320 in isolation or the pallet foot extender 310 disposed on the first pallet foot 320, etc.) and the example pallet connector 200 first connector 210 positively, yet releasably, interlock when they are stacked.

Figure 5:
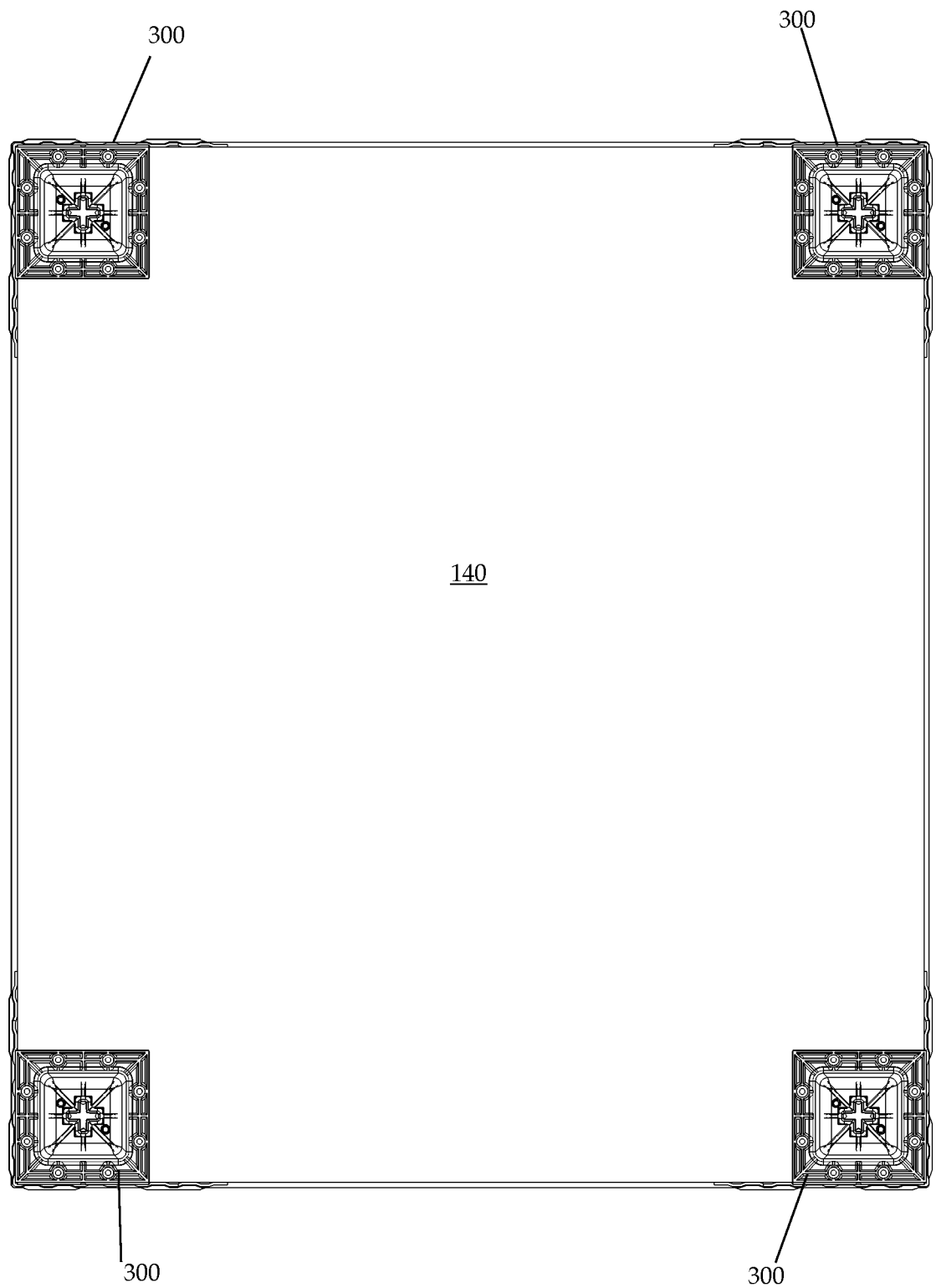
FIG. 5 is an example bottom view of the example pallet system in accord with at least some of the present concepts.
Figure 6:
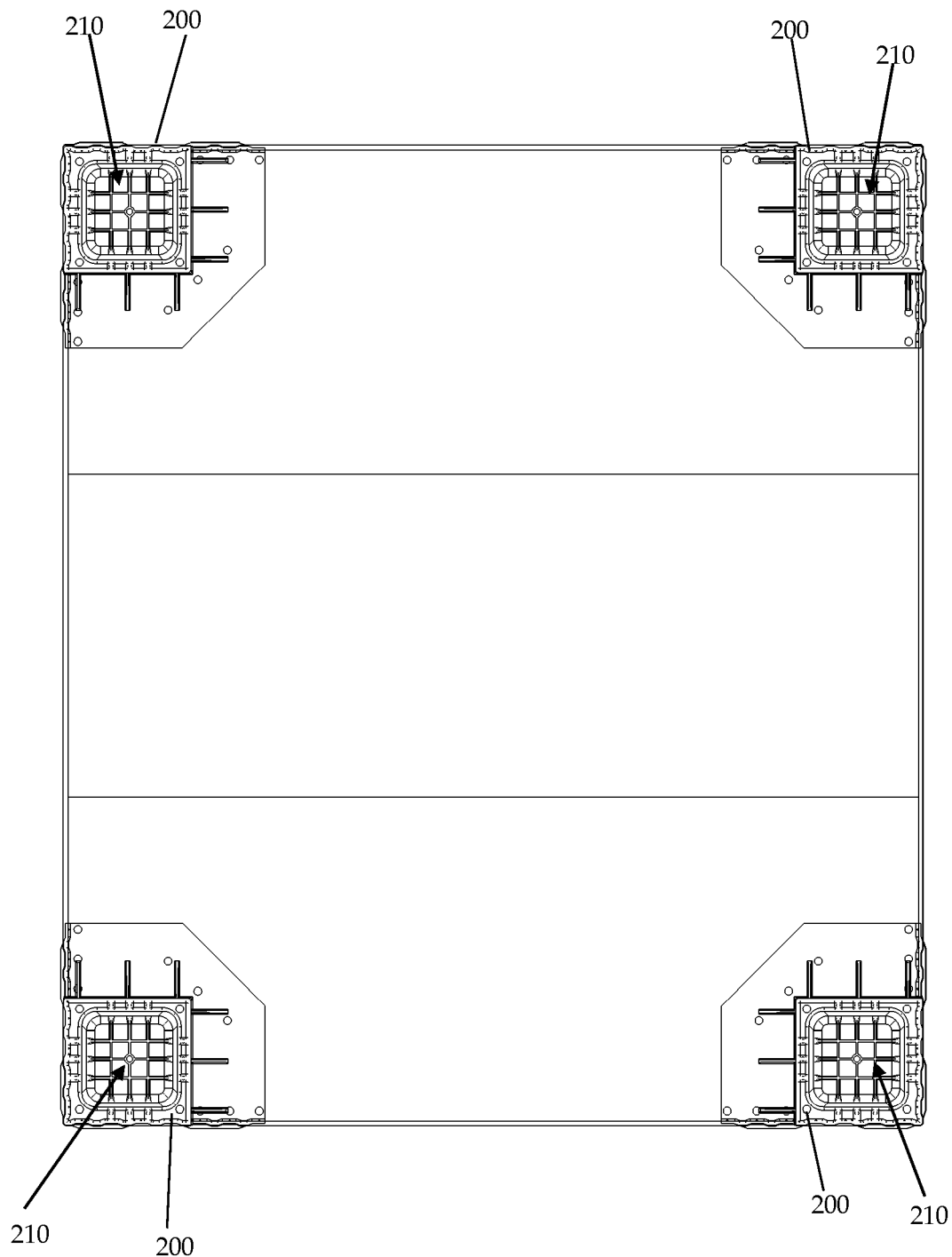
FIG. 6 is an example top view of the example pallet system in accord with at least some of the present concepts.

FIG. 5 is an example bottom view of the example pallet system in accord with at least some of the present concepts. Although four example pallet feet 300 are shown, more pallet feet 300 could alternatively be provided. For instance, a fifth pallet foot 300 could be provided in a center of the example substantially planar support surface 140, 150. In another example, six pallet feet 300 could be provided, with an additional pallet foot 300 (not shown) disposed between (e.g., midway) the pallet feet 300 disposed at the corners of the substantially planar support surface 140, 150 along a longer dimension of the substantially planar support surface

140, 150. In some examples, these additional pallet feet 300 may be the same configuration as the pallet feet 300 disposed at the corners of the substantially planar support surface 140, 150, or may be differently configured (e.g., different dimensions, only the first pallet foot 320, etc.). In some examples, one or more pallet feet 300 are disposed in, or spaced apart within, a central portion of the example substantially planar support surface 140, 150.

In some examples, columnar reinforcing members (not shown) are optionally disposed to extend between the example pallet connectors 200 to the example substantially planar support surface 140, 150, with the example substantially planar support surface 140, 150 being dimensioned to be slightly larger than the footprint of the array 120 of product containers to accommodate the reinforcing members. The optional columnar reinforcing members (e.g., rigid bars, rigid slats, etc.) transmit loading, such as a weight of a pallet disposed on top of another pallet, away from the array of product(s) borne by the pallet. In some examples, the reinforcing members comprise a cardboard, wood, polymer, plastic, composite, or metal member. In some examples, the reinforcing members are planar. In some examples, the reinforcing members are angled to cover the corners of the array 120 of product containers.

Although certain example apparatus, articles of manufacture and methods have been disclosed herein, the scope of coverage of this patent is not limited thereto. To the contrary, this patent covers all methods, apparatus and articles of manufacture fairly falling within the scope of the claims of this patent. For instance, while the example pallet connectors 200 are shown to correspond to corner units disposed on the corners of the array 120 of product containers, the example pallet connectors 200 may also include side units configured for placement on sides of the array 120 of product containers between the illustrated corner units.

One aspect of present concepts includes a pallet connector system, comprising a plurality of pallet connectors each pallet connector of the plurality of pallet connectors comprising a body defining a first connector comprising a male connector, a female connector, or both a male connector and a female connector on a first side of the body and further comprising one or more lateral structures extending from a second side of the body, the one or more lateral structures to prevent movement of the body relative to a structure on which the body is disposed, and a plurality of pallet feet, each pallet foot of the plurality of pallet feet comprising a body defining a shape dimensioned for engagement with the first connector. In some examples, the first lateral wall, the second lateral wall, or both the first lateral wall and the second lateral wall comprise at least one strap retention feature. In some examples, the at least one strap retention feature comprises one or more upper protrusions and one or more lower protrusions spaced apart from the one or more upper protrusions by a predetermined distance generally dimensioned to accept and retain a pallet connector strap. In some examples, the one or more upper protrusions and the one or more lower protrusions comprise spaced apart continuous protrusions defining a channel to accept and retain the pallet connector strap. In some examples, the first connector comprises a female connector dimensioned to receive a mating pallet foot. In some examples, the pallet foot comprises a first pallet foot and a pallet foot extender, wherein the pallet foot comprises a first male connector with a first female connector formed within a central portion of the first male connector, wherein the pallet foot extender comprises a second female connector with a second male connector formed within a central portion of a first female connector, wherein the first male connector of the pallet foot is cooperatively received within the second female connector of the pallet foot extender, and wherein the second male connector of the pallet foot extender is cooperatively received within the first female connector of the pallet foot. In some examples, an underside of one or more of the lateral structures, first lateral wall, second lateral wall and/or top wall comprise a surface feature to engage a surface of a product container or surface on which the pallet connector is disposed. In some examples, the plurality of pallet feet are each about 3" in height. In some examples, each of the plurality of pallet feet comprise a first pallet foot and a pallet foot extender, wherein the pallet foot comprises a first male connector with a first female connector formed within a central portion of the first male connector, wherein the pallet foot extender comprises a second female connector with a second male connector formed within a central portion of a first female connector, wherein the first male connector of the pallet foot is cooperatively received within the second female connector of the pallet foot extender, and wherein the second male connector of the pallet foot extender is cooperatively received within the first female connector of the pallet foot.

In some aspects of the present concepts, a method for organizing product containers on a pallet, the method comprises the acts of disposing a first array of product containers on a pallet comprising a plurality of first pallet feet, the pallet being dimensioned at least substantially similarly to that of a first footprint of the first array of product containers, and disposing a plurality of first pallet connectors on an upper surface of the first array of product containers, each pallet connector of the plurality of first pallet connectors comprising a body defining a first connector comprising a male connector, a female connector, or both a male connector and a female connector on a first side of the body and further comprising one or more lateral structures extending from a second side of the body, the one or more lateral structures to prevent movement of the body relative to a structure on which the body is disposed, wherein the first array of product containers may include an n×n array, an n×m array, or a combination of one or more n×n arrays and one or more n×m arrays, wherein n and m may be any integer. In some aspects of this method, the method further comprises the acts of disposing a second array of product containers on a pallet comprising a plurality of second pallet feet, the pallet being dimensioned at least substantially similarly to that of a second footprint of the second array of product containers, and disposing a plurality of second pallet connectors on an upper surface of the second array of product containers, each pallet connector of the second plurality of pallet connectors comprising a body defining a first connector comprising a male connector, a female connector, or both a male connector and a female connector on a first side of the body and further comprising one or more lateral structures extending from a second side of the body, the one or more lateral structures to prevent movement of the body relative to a structure on which the body is disposed, wherein the second array of product containers may include an n×n array, an n×m array, or a combination of one or more n×n arrays and one or more n×m arrays, wherein n and m may be any integer, wherein the second pallet feet are dimensioned to engage the first connectors of the plurality of first pallet connectors, and wherein the first footprint of the first array is at least substantially the same as the second footprint of the second array.

In some aspects of the above-noted example method for organizing product containers on a pallet, the method further comprises connecting the plurality of first pallet connectors via a strap or tensioner applied circumferentially about the one or more lateral structures of each of the first pallet connectors and/or connecting the plurality of second pallet connectors via a strap or tensioner applied circumferentially about the one or more lateral structures of each of the second pallet connectors.

In some aspects of the above-noted example methods for organizing product containers on a pallet, the first pallet connectors and/or the second pallet connectors comprise pallet connector(s), as disclosed herein. In some aspects of the above-noted example methods for organizing product containers on a pallet, the pallet feet comprise the pallet feet, as disclosed herein. In some aspects of the above-noted example methods for organizing product containers on a pallet, the first pallet connectors and/or the second pallet connectors comprise pallet connector(s), as disclosed herein, and the pallet feet comprise the pallet feet, as disclosed herein.

What is claimed is:

1. A pallet connector, comprising:
   a body, comprising:
      a base comprising a first side and a second side;
      a connector extending from the first side of the base and comprising an exterior surface;
      a plurality of braces coupled to and between the first side of the base and the exterior surface of the connector;
      a first lateral wall and a second lateral wall each extending from the second side of the base,
   wherein the first lateral wall and the second lateral wall are to inhibit movement of the body relative to a structure on which the body is disposed,
   wherein the connector comprises a female connector comprising a plurality of walls extending from the first side of the base and defining and enclosing a recess, the recess dimensioned to receive therein a pallet foot,
   wherein at least one of the first lateral wall or the second lateral wall comprise at least one strap retention feature.

2. The pallet connector of claim 1, wherein the at least one strap retention feature comprises one or more upper protrusions and one or more lower protrusions spaced apart from the one or more upper protrusions by a predetermined distance dimensioned to accept and retain a pallet connector strap.

3. The pallet connector of claim 2, wherein the one or more upper protrusions and the one or more lower protrusions comprise spaced apart protrusions defining a channel.

4. The pallet connector of claim 1, further comprising a pallet foot extender comprising a male connector formed within a central portion of the pallet foot extender.

5. The pallet connector of claim 1, wherein the pallet connector is formed from a polymer, polyethylene terephthalate, polycarbonate, high-density polyethylene, polyvinyl chloride, or an acrylonitrile butadiene styrene.

6. The pallet connector of claim 1, wherein at least one of the base, the first lateral wall, or the second lateral wall comprises a surface feature to engage a surface of a container.

7. The pallet connector of claim 1,
   wherein the first lateral wall comprises a plurality of ribs spaced apart along a length of the first lateral wall, and
   wherein the second lateral wall comprises a plurality of ribs spaced apart along a length of the second lateral wall.

8. The pallet connector of claim 2, wherein the one or more upper protrusions and the one or more lower protrusions comprise spaced apart protrusions defining a channel.

9. The pallet connector of claim 1, wherein the strap retention feature comprises one or more ribs extending along a first lateral direction of the first lateral wall and comprises one or more ribs extending along a second lateral direction of the second lateral wall.

10. The pallet connector of claim 1, wherein a depth of the recess of the connector is between about 1.25" and about 3".

* * * * *